June 30, 1959  E. F. KIERNAN  2,892,993
ULTRASONIC PROBE
Filed June 2, 1953

INVENTOR.
EARL F. KIERNAN
BY George Sipkin
George E. Pearson
ATTORNEYS

United States Patent Office 2,892,993
Patented June 30, 1959

2,892,993

ULTRASONIC PROBE

Earl F. Kiernan, San Diego, Calif.

Application June 2, 1953, Serial No. 359,241

8 Claims. (Cl. 340—13)

(Granted under Title 35, U.S. Code (1952), sec. 266)

The invention described herein may be manufactured and used by or for the Government of the United States of America for governmental purposes without the payment of any royalties thereon or therefor.

This invention relates generally to instruments for use in the measurement of ultrasonic field intensity and more specifically to an ultrasonic probe.

It is an object of this invention to provide an instrument for use in measuring the intensity of an ultrasonic field in a fluid without appreciably disturbing the configuration of the field up to a frequency of one megacycle, or higher.

It is a further object to provide an extremely sensitive ultrasonic field detection instrument.

Still a further object is the provision of an ultrasonic probe which does not require the use of crystal transducers.

Another object is to provide a sound detection instrument which compensates for temperature changes of the medium in which the sound measurement is taken.

Still another object is the provision of a highly sensitive ultrasonic probe which is simple and inexpensive in construction.

Other objects and many of the attendant advantages of this invention will be readily appreciated as the same becomes better understood by reference to the following detailed description when considered in connection with the accompanying drawings wherein.

Figure 1:
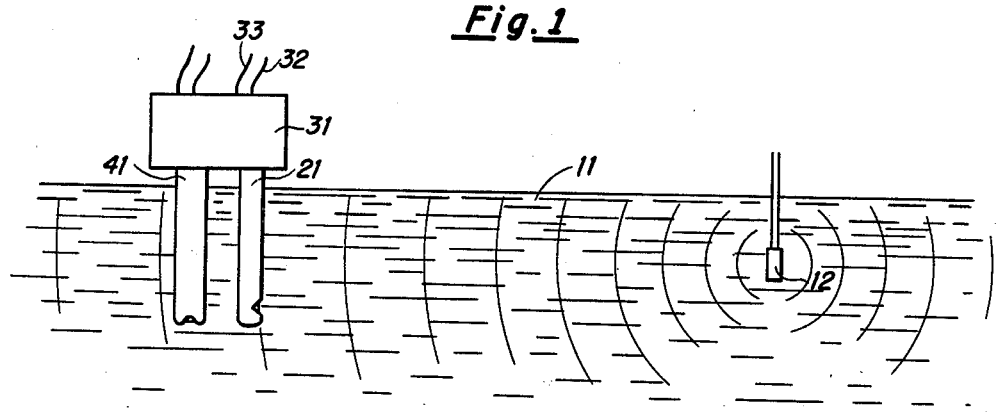
Fig. 1 is a schematic illustration of an embodiment of the invention in use in measuring the sound waves generated by a vibrating crystal.

Referring to the drawings, Fig. 1 illustrates the use of the invention in measuring sound wave intensity in a fluid 11 at a selected point distant from a sound generating source, such as a piezoelectric crystal 12.

The field intensity of the generated compressional energy waves at any desired point in the liquid is detected by an active probe generally designated 21, which may be used in conjunction with a compensating balance probe 41.

The active probe 21 consists of a laminated structure in which two very thin strips 22, 23 of conductive material, such as nickel are sandwiched in between two thin outer layers 25, 26 of insulating material, such as mica. In one constructed embodiment nickel strips of .001 inch thickness and mica sheets of .004 inch thickness have been used satisfactorily.

The fabrication of the probe requires the use of a suitable adhesive to cement the parts of the probe together. It is necessary that the adhesive have good electrical insulating qualities and at the same time have high resistance to the absorption of moisture. Examples of adhesives which satisfy these requirements and which have been used successfully are silicone synthetic resins, such as Dow Corning Corp. #993 Silicone Varnish; and rubber cements such as Vulcalock manufactured by B. F. Goodrich Co.

A V-shaped notch is formed in one side of the sandwich near one end thereof, and across this notch is stretched a length of very fine resistance filament 27, consisting of material such as constantan, or any other suitable resistance material such as what is known by the trade names of Nichrome and Advance. A constantan wire of .001 inch diameter has been used satisfactorily. The ends of the resistance filament are secured to the two conductive strips 22 and 23, as by soldering or welding.

The two conductive strips 22 and 23 serve the dual purpose of stiffening the structure and acting as electrical connections to and from the ends of the resistance filament 27.

The end opposite that in which the notch is cut may be mounted in a suitable holder 31 which may house electrical leads 32, 33 for connection to the protruding ends of the conductive strips 22, 23, and also act as a support-structure for the whole assembly.

The probe 21 depends from the holder 31 and the notched end thereof is immersed beneath the surface of the liquid. The notched side of the probe 21 is positioned to face the oncoming sound waves to be measured. It will readily be seen that the pressure of the sound wave at the location of the resistance filament 27 will cause a strain in the filament 27 and this strain will be reflected in a corresponding proportionate resistance of the filament.

Figure 4:
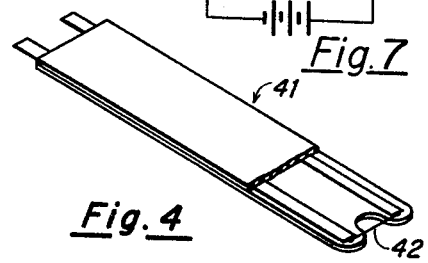
Fig. 4 is a perspective view partially in section of the second of the two probes shown in Fig. 1.
Figure 5:
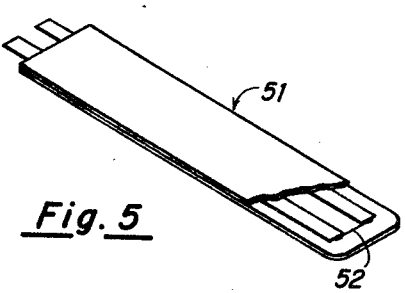
Fig. 5 is a perspective view partially in section of a modification of a temperature compensating device which may be used in lieu of the probe shown in Fig. 4.

In Figs. 4 and 5 are shown compensating probes 41 and 51, either of which may be used in conjunction with the probe 21, as desired, as a temperature compensator. These probes are constructed similarly to probe 21, except that the resistance filament, 42 and 52 respectively, of these two probes is mounted perpendicular to the longitudinal axis of the body of the probe. The probe 41 has a notch in the end of the probe which exposes the resistance filament 42, while the probe 51 has no notch and the filament 52 is completely embedded in the sandwich between the two insulating layers.

As shown in Fig. 1, wherein probe 41 is used with probe 21, the mounting of the probes in parallel depending relation from the holder 31 provides an active sound intensity detecting probe with its resistance filament facing the oncoming sound wave, and a temperature compensating probe 41 with its resistance filament having its axis normal to the sound wave and thus not materially affected thereby. It will be apparent that while this arrangement of probes 21 and either 41 or 51 provides a more convenient arrangement, if desired a pair of identical probes 21 might be used, with one mounted to have its resistance filament intercept the sound beam and the other mounted as near as possible to the first and at right angles thereto so as not to have its resistance filament intercept the sound beam.

Figures 2, 3:
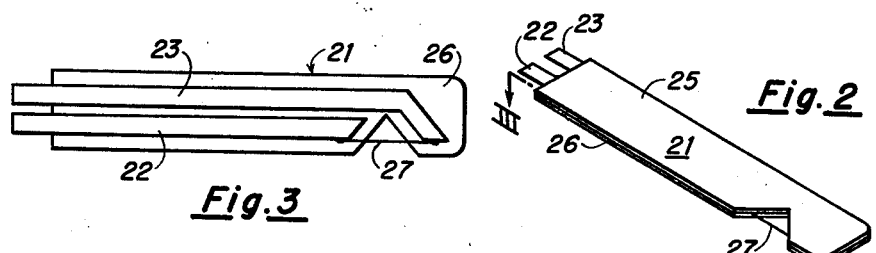
Fig. 2 is a perspective view of one of the probes shown in Fig. 1.
Fig. 3 is a sectional view taken along line III—III of Fig. 2.
Figure 7:
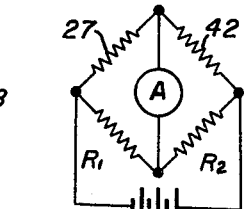
Fig. 7 shows a bridge circuit including as arms thereof filaments of the probes disclosed in Fig. 1.

In order to utilize the change in resistance of the resistance filament in the probes for measuring the sound field intensity, the sound intensity probe 21 and the temperature compensating probe, whether it be probe 41, 51 or a duplicate probe 21, are used as two of the bridge arms in an A.-C. Wheatstone bridge, or other suitable bridge as illustrated in Fig. 7 where $R_1$ and $R_2$ are the fixed resistances of the circuit. For example, the bridge circuit shown in Fig. 2 of the U.S. patent to Ruge, No. 2,344,642 could be utilized with filament 27 of probe 21 or filament 62 of probe 61 connected as arm 8 of the bridge of Ruge and filaments 42, 52, or 63 of probes 41, 51, 61, respectively, connected as arm 9 of the Ruge bridge.

In using the probes of the present invention the probes should be of such size that their thickness dimension presented to the advancing wave front is considerably less than one quarter wave length of the sound to be measured. This will minimize the disturbance to the sound field due to the presence of the probe.

Figure 6:
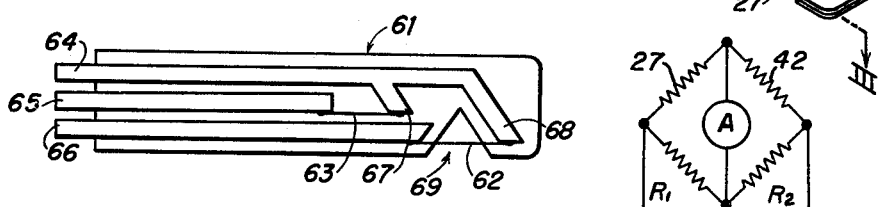
Fig. 6 is a sectional view corresponding to the view of Fig. 3 of a modification of the invention.

Fig. 6 illustrates a modification of the invention wherein both the sound responsive and temperature compensating filaments 62, 63 are mounted in a single probe 61. In this embodiment three conductive strips 64, 65, 66 are provided, strip 64 having two legs 67 and 68 thereon. Between the end of the leg 68 and the end of strip 66 is mounted the sound intensity responsive wire 62 across the notch 69. Between the leg 67 and the end of strip 65 is mounted the temperature compensating filament 63. Thus the temperature compensating filament is embedded between the sandwich outer layers of insulating material, while the sound intensity responsive filament 62 is exposed as in probe 21. In this construction the filament 63 will reflect temperature changes for compensation of filament 62, but will not be disturbed by the sound wave pressure, while the filament 62 will change in resistance with changes in pressure of the sound wave as in probe 21. In the probe 61 the protruding ends of each of the strips 64, 65, 66 provide electrical connecting points for the bridge connection. The end of strip 64 is common and two resistance arms may be formed by connecting between the ends of strips 64 and 65 and the ends of strips 64 and 66.

Obviously many modifications and variations of the present invention are possible in the light of the above teachings. It is therefore to be understood that within the scope of the appended claims the invention may be practiced otherwise than as specifically described.

What is claimed is:

1. A probe for use in measuring sound intensity in a fluid, comprising a supporting body having a notch therein, a resistance filament stretched in exposed unsupported relation across said notch and secured at the ends to said body, and means in said body for electrically connecting said filament to an electrical indicating means.

2. A probe as defined in claim 1 wherein said body has substantially flat sides in one spatial dimension and wherein said notch is formed in a side at right angles to said flat sides.

3. A probe as defined in claim 1 wherein the linear dimension in one spatial dimension of said probe is of an extent substantially less than one quarter wave length of a sound wave to be measured.

4. An ultrasonic field intensity detecting probe comprising a sandwich of two layers of insulating material having conducting strips therebetween, a notch being formed in one side of said layers, and a filament stretched across said notch in unsupported relation and secured at the ends to said conducting strips.

5. A probe as in claim 4 wherein the thickness of said sandwich is substantially less than one quarter wave length of the sound wave of a sound field the intensity of which is to be measured.

6. A temperature-compensated compressional wave intensity detecting probe comprising a body, a notch formed in said body, a first resistance filament secured at the ends to said body in exposed unsupported stretched relation across said notch, a second resistance filament embedded in unexposed relation in said body, and means for electrically connecting said filaments to an electrical indicating means.

7. A probe as defined in claim 6 wherein said electrical connecting means comprises first, second and third conductive strips embedded in said body, said first filament being secured to and between said first and second strips, and said second filament being connected between said first and third strips.

8. A probe as defined in claim 7 wherein said body comprises at least two insulating sheets of material bonded together with said strips secured therebetween.

References Cited in the file of this patent

UNITED STATES PATENTS

| | | |
|---|---|---|
| 2,344,642 | Ruge | Mar. 21, 1944 |
| 2,420,148 | Ostergren | May 6, 1947 |
| 2,509,421 | Carter | May 30, 1950 |
| 2,627,749 | Li | Feb. 10, 1953 |
| 2,637,210 | Hathaway | May 5, 1953 |
| 2,648,828 | Teichman | Aug. 11, 1953 |
| 2,729,730 | Brady | Jan. 3, 1956 |